United States Patent [19]
Kilb

[11] Patent Number: 5,783,329
[45] Date of Patent: Jul. 21, 1998

[54] ACCUMULATOR WITH PLASTIC CASING

[75] Inventor: Manfred Kilb, Frankfurt am Main, Germany

[73] Assignee: Christoph Emmerich GmbH + Co. KG, Frankfurt am Main, Germany

[21] Appl. No.: 586,775
[22] PCT Filed: Jul. 16, 1994
[86] PCT No.: PCT/DE94/00836
    § 371 Date: Apr. 15, 1996
    § 102(e) Date: Apr. 15, 1996
[87] PCT Pub. No.: WO95/04380
    PCT Pub. Date: Feb. 9, 1995

[30] Foreign Application Priority Data
Jul. 29, 1993 [DE] Germany .......... 43 25 464.0

[51] Int. Cl.$^6$ .......................................... H01M 2/08
[52] U.S. Cl. ........................................ 429/174; 429/181
[58] Field of Search .................. 429/171–174, 429/178–185

[56] References Cited

U.S. PATENT DOCUMENTS

| 4,212,934 | 7/1980 | Salamon ..................... 429/181 |
| 4,215,187 | 7/1980 | Gnida et al. .............. 429/181 X |
| 4,859,547 | 8/1989 | Adams et al. ............. 429/180 X |
| 4,957,832 | 9/1990 | Ruggeberg et al. ...... 429/173 X |
| 5,229,223 | 7/1993 | Hyland ...................... 429/174 X |

*Primary Examiner*—Anthony Skapars

[57] ABSTRACT

So that an accumulator having a gas-tight and liquid-tight, electrolyte-filled casing in which are arranged electrodes which are separated from each other by a separator and which are each electrically connected to pole contacts accessible from the outside of the casing can be produced in an advantageous manner from the point of view of the manufacturing procedure, wherein the accumulator is to have a durably and reliably sealed casing which is not restricted in terms of its shape, it is provided that in the region of the pole contacts the casing comprises a soft plastic material and a hard plastic material which are fixedly connected together, the soft plastic material forming a seal for the pole contacts and/or the feed-through ducting means of the pole contacts.

18 Claims, 5 Drawing Sheets

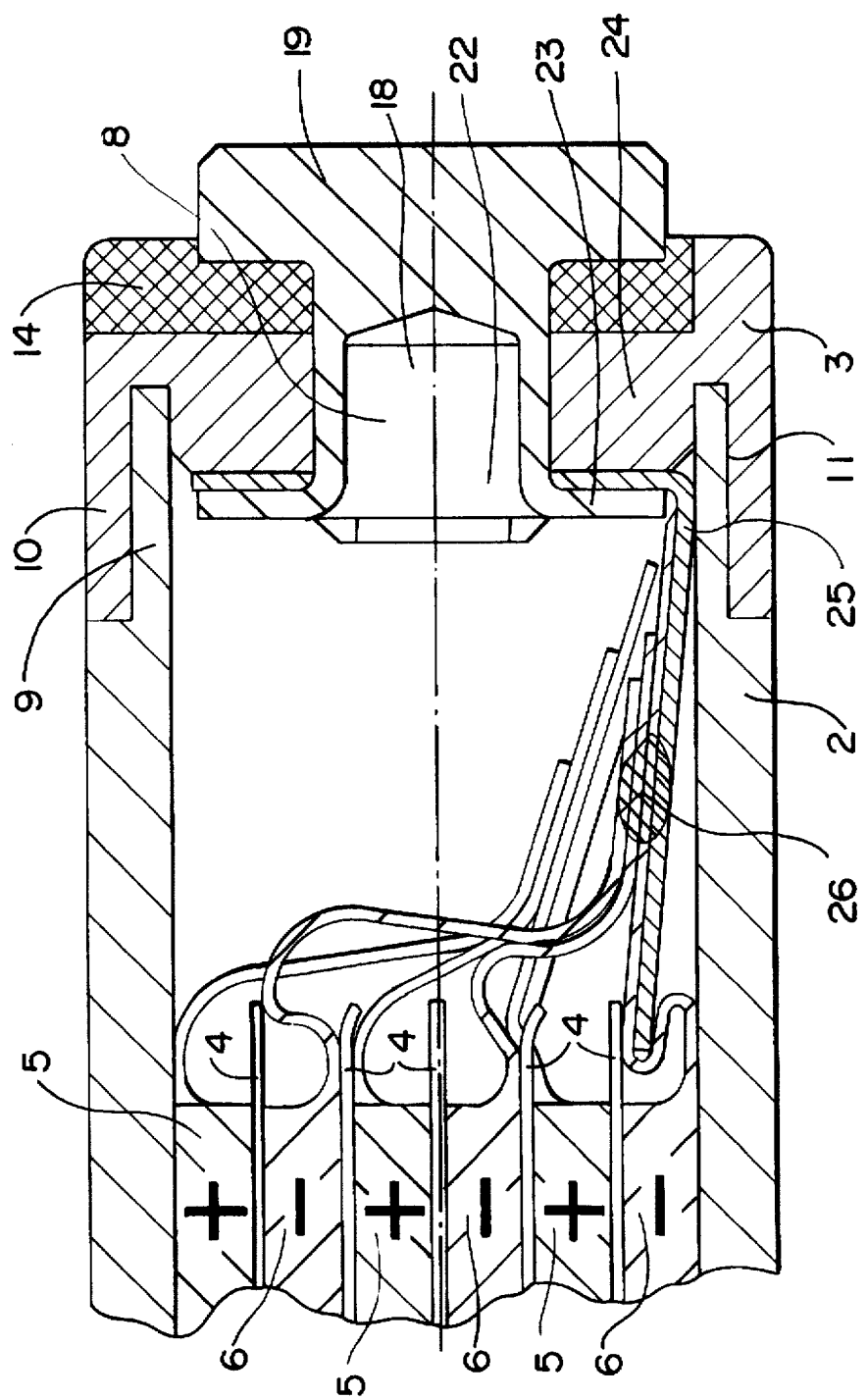

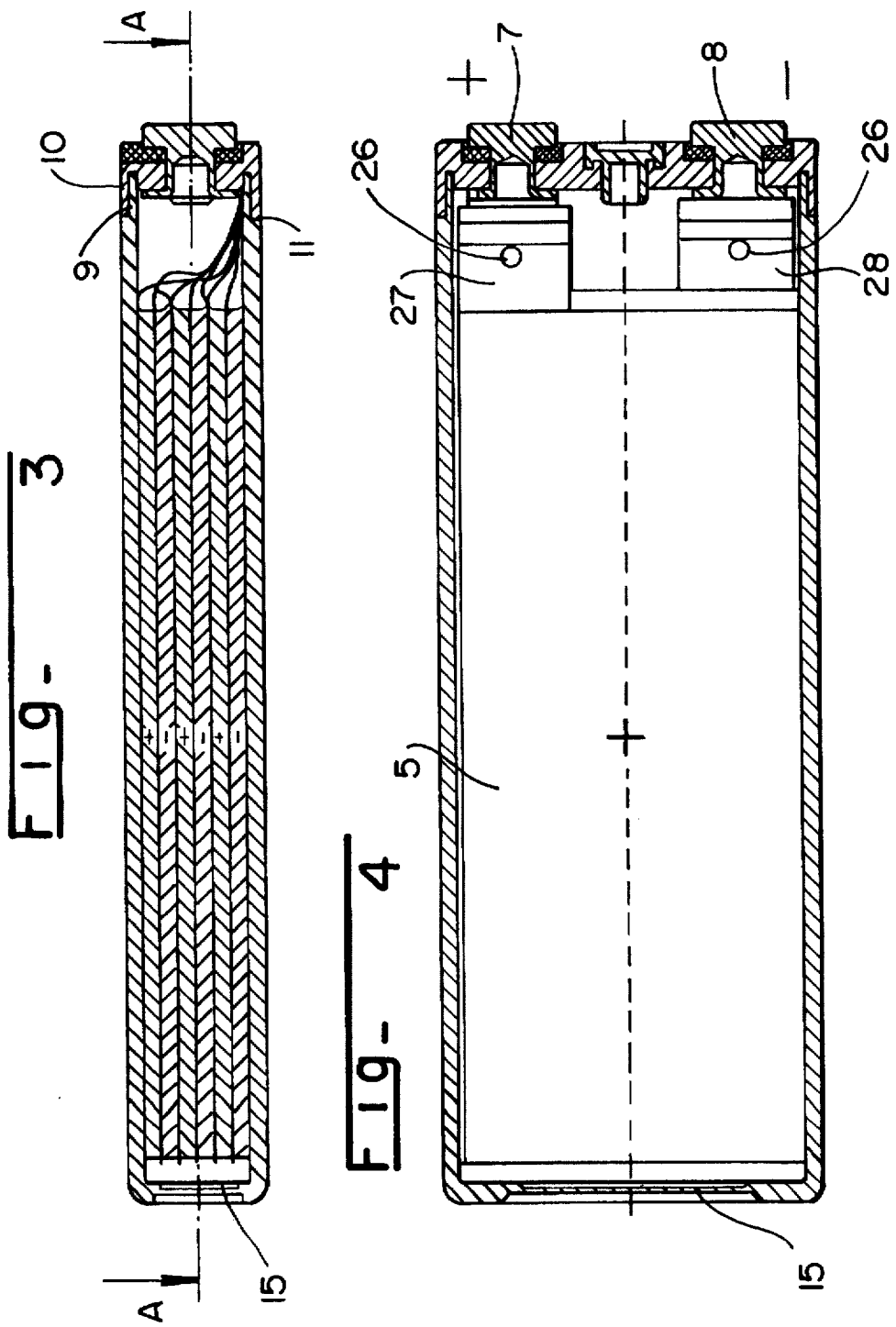

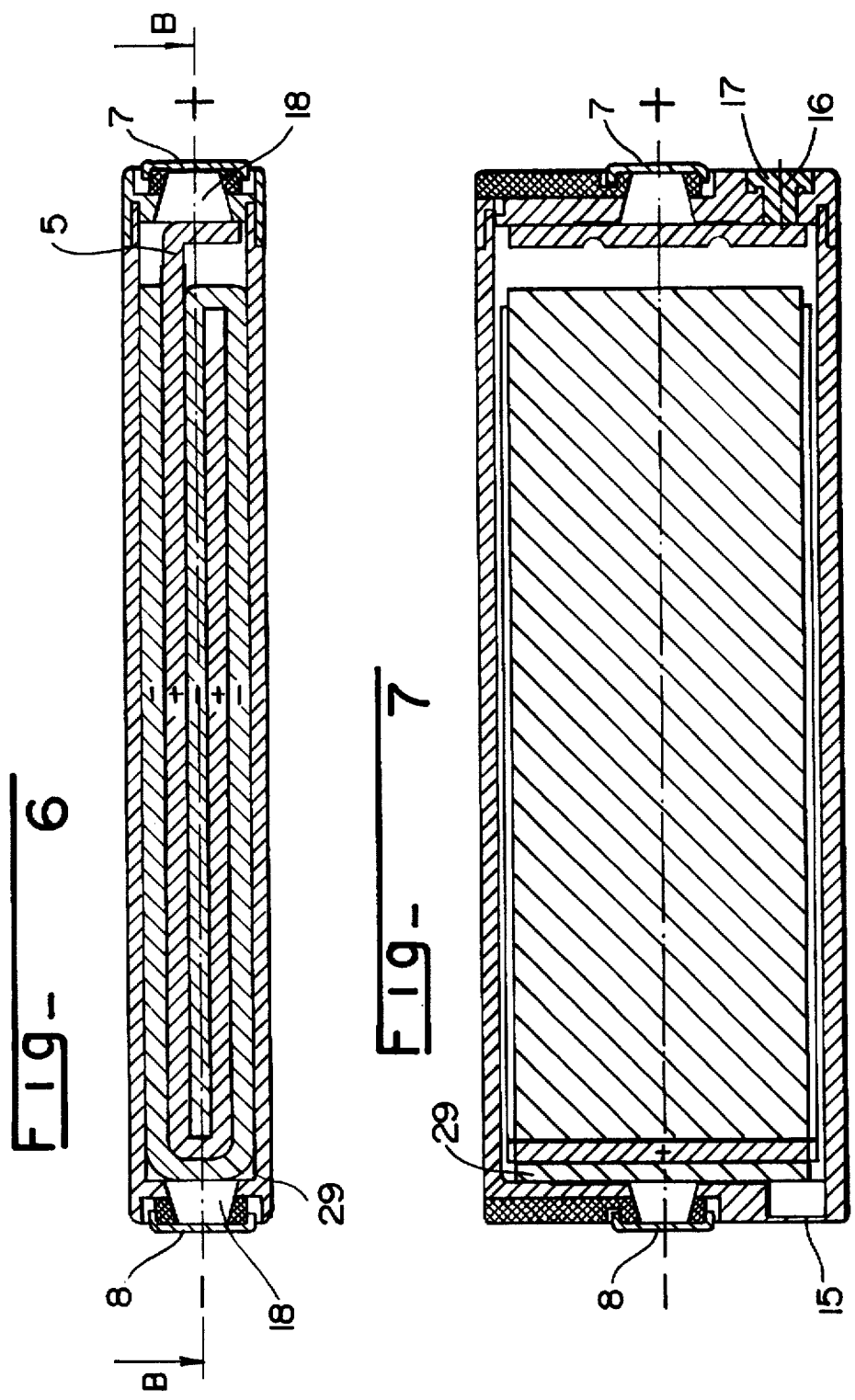

ACCUMULATOR WITH PLASTIC CASING

BACKGROUND OF THE INVENTION

1. Field of the Invention

The invention concerns an accumulator with a gas-tight and liquid-tight electrolyte filled casing in which electrodes are separated from each other by a separator and are respectively electrically connected to pole contacts that are accessible from outside of the casing.

2. Discussion of the Prior Art

Accumulators of that kind are known with a large number of different casing shapes. A conventional alkaline accumulator has a cylindrical casing which comprises metal and forms a pot-shaped, electrolyte-filled container both for the electrodes and also for the separator. The cover which holds the positive pole contact is fitted into the opening of the pot configuration. In that case the flanged-over edge forms a holding arrangement which is both gas-tight and also liquid-tight. However, a metal casing of that kind is difficult to produce when dealing with non-round and in particular rectangular cells.

The use of plastic casings is known for lead-acid accumulators and makes it possible to produce rectangular casings, while making good use of the available space. This construction however cannot be applied to all types of accumulators. The metal pole contacts which are cast into the plastic material casing or the metal feed-through ducting means thereof are of different coefficients of thermal expansion from the plastic material, but nonetheless may not became leaky upon an increase in temperature during charging or discharging at high current levels. It is necessary throughout the entire service life of the accumulator to ensure that neither gas nor electrolyte accidentally escapes. Accumulators with a very low internal resistance such as for example alkaline nickel-cadmium or nickel-metal hydride accumulators may build up greatly increased internal pressures under a high current loading, and such pressures should not result in leaks occurring in the region of the pole contacts.

Seals which are fitted between the casing and the pole contact, such as for example the elastic round-cord rings which are referred to as O-rings require an additional production step in terms of inserting and correctly positioning the seal and therefore have an adverse effect on the production costs of the accumulator. Difficult electrolytes which, by virtue of a high capillary action, have a tendency to creep under seals, such as for example caustic potash solution, which additionally exhibits a migration movement in the direction of negative potential, can escape from the casing if the seal is not correctly inserted or if the seal is subsequently mechanically displaced, and they can subsequently give rise to damage.

EP-A1-0 089 619 describes a gas-tight and liquid-tight pole sealing arrangement which is desired in particular for lead accumulators whose casing consists of plastic material. For sealing purposes, there is proposed therein a sealing system which comprises a plurality of layers of different materials and in which inter alia a free chamber is designed to surround the pole contact, and melt adhesives and further seals are arranged on that chamber. However that pole sealing arrangement can only be produced by a considerable number of production steps.

U.S. Pat. No. 5 197 994 discloses thermal casing welding procedures in respect of battery casings which comprise plastic material.

EP-A2-0 538 039 discloses an inserted cap which comprises a sealing means and which, in the case of a cylindrical battery, holds the central electrode and the pole contact relative to the casing and at the same time forms a seal for the battery casing to prevent fluid from escaping.

SUMMARY OF THE INVENTION

Consequently the object of the present invention is to provide an accumulator which is advantageous in terms of production from the manufacturing process point of view and which has a durably and reliably sealed casing which is not restricted in terms of its shape.

That object is attained by an accumulator with a gas-tight and liquid-tight electrolyte filled casing in which electrodes are separated from each other by a separator and respectively electrically connected to pole contacts that are accessible from outside the casing, wherein in a region of the pole contacts the casing comprises a soft plastic material and a hard plastic material fixedly connected together and the soft plastic material forms a seal for the pole contacts and/or for a feed-through ducting means of the pole contacts.

Making the casing in the region of the pole contacts from a soft and a hard plastic material which are fixedly connected together makes it possible to use the soft plastic material as a seal for the pole contacts and/or for the feed-through ducting means of the pole contacts. In that respect displacement of the seal due to external influences can be prevented by the mechanical connection between the two plastic materials. This design configuration also provides that there is essentially only one sealing surface, namely the sealing surface between the soft plastic material and the pole contact and/or the feed-through ducting means thereof. Therefore the electrolyte or the gas developed thereby can no longer escape along a second sealing surface between the seal and the casing. Furthermore, a sealing contact of the soft plastic material against the pole contact or the feedthrough ducting means thereof can be so designed that the sealing surface is greatly enlarged and fluid has to creep under long distances if it is to be escape.

This design configuration is advantageous from the point of view of manufacturing procedure as, after the soft and the hard plastic materials are joined together, suitable openings for the pole contacts can be formed therein, for example by stamping, with a high degree of accuracy. Alternatively, a pole contact or its feed-through ducting means, which is already held in the hard plastic material, can be subsequently surrounded by the soft plastic material in a hot-in-hot injection welding process. That gives in each case a connection between the soft and the hard plastic materials, over the full surface area thereof.

As both plastic materials essentially comprise the same thermoplastic elastomer and differ from each other in terms of their hardness either by a differing addition of plasticisers or by virtue of a different degree of cross-linking, there are no detrimental thermal stresses involved. The choice of the thermoplastic elastomer makes it possible to use chemically inert materials, such as for example modified polyamides, styrene-ethylene-butylene-styrene copolymers or polypropylenes which have excellent levels of resistance relative to the electrolyte.

Highly developed production procedures which are available at the present time for shaped plastic members such as for example injection welding can be used without limitation, whereby the shape of the casing is no longer restricted.

In a preferred embodiment the pole cap of the pole contact is connected to the feed-through ducting means thereof by spot welding and engages cup-like over a part of the soft plastic material. That increases the creep distance under the seal, by the area with which the soft plastic material bears against the pole cap. The pole cap is correctly positioned upon being subsequently fitted to the feed-through ducting means, by the soft plastic material.

An alternative embodiment uses a pole contact which comprises a substantially cup-shaped rivet and the rearward end of which, in the manufacturing operation, is flanged over in such a way that it engages behind a part of the hard plastic material. In that situation, the front region of the pole contact is always securely held in sealing contact against the soft plastic material by the flanged-over part of the rivet. In that respect, in a manner which is advantageous from the point of view of the manufacturing procedure involved, the flanged-over part of the rivet may engage behind a conductive tongue which is inserted between the rivet and the casing and which makes the electrical contact with the respective electrode. In that way both the pole contact can be fitted in position and also the electrical connection thereof can be made in a single working step by riveting, in an inexpensive operating procedure.

A further improvement in regard to manufacturing procedure is achieved if the casing of the accumulator includes between two casing portions a volume which extends therearound and which, in the operation of injection welding of the soft plastic material, can also be simultaneously filled. The soft plastic material within that volume advantageously serves as an additional casing seal but does not require any manufacturing step of its own.

If both casing portions comprise a plastic material of approximately the same hardness, they can be securely and durably sealingly connected together by ultrasonic welding in an overlapping region.

In an alternative configuration both casing portions are held together by retaining elements which are disposed in an overlapping region. In that way the casing portions can be securely joined together by being simply pressed together in an operation which is advantageous from the point of view of the manufacture procedure involved. If, after the two casing portions have been latched together, the soft plastic material is introduced into the volume extending around the casing, the soft plastic material and the hard plastic material of the two casing portions are sealingly joined together over their full areas by virtue of the welding operation in that region. If the two casing portions are latched together after the operation of injecting or spray welding the soft plastic material, the retaining elements guarantee that the hard plastic material of the one casing portion bears sealingly against the soft plastic material of the other casing portion.

By embedding glass fibres in the plastic material, preferably in a proportion by volume of about 40%, it is possible markedly to improve the mechanical properties of the casing, such as its impact strength, its breaking load-carrying capacity and its flexural load-carrying capacity.

With a rectangular accumulator casing in which the electrodes are arranged in superposed relationship in a layer-wise manner respectively separated by the separator, it is possible to eliminate unused volumes and it is possible to provide an accumulator of high capacity.

In the case of gas-tight alkaline accumulators such as for example nickel-cadmium or nickel-metal hydride accumulators, a desired-rupture location can be disposed as a portion of reduced thickness, within the casing portion which comprises hard plastic material. That prevents the accumulator from exploding in the event of an abrupt rise in internal pressure by virtue of specific gas discharge by way of the desired-rupture location.

Subsequent filling of the accumulator with the electrolyte is made possible by virtue of a closable filling opening. Arranging the filling opening closer to the positive pole contact than to the negative pole contact reduces the creep effect when using caustic potash solution as the electrolyte.

In another embodiment the casing of the accumulator at the same time also forms a part of a casing of an electrical device. That makes it possible for example to simplify the construction of portable radiotelephones and to reduce the size of the accumulator, in spite of the accumulator being of high capacity.

DESCRIPTION OF THE DRAWINGS

The invention is described in greater detail hereinafter with reference to the drawings in which:

FIG. 2 is a partly cross-sectional view through an accumulator of a second embodiment according to the invention with a rivet-like pole contact, FIG. 3 is a view in cross-section through an accumulator according to the invention with a rectangular casing and pole contacts arranged on one side of the casing, FIG. 4 is a view in cross-section through the accumulator in FIG. 3 along line A—A, FIG. 6 is a view in cross-section through an accumulator with a rectangular casing and pole contacts arranged on two opposite sides of the casing, and FIG. 7 is a view in cross-section through the accumulator of FIG. 6 along line B—B.

DETAILED DESCRIPTION OF PREFERRED EMBODIMENTS

Figure 1:
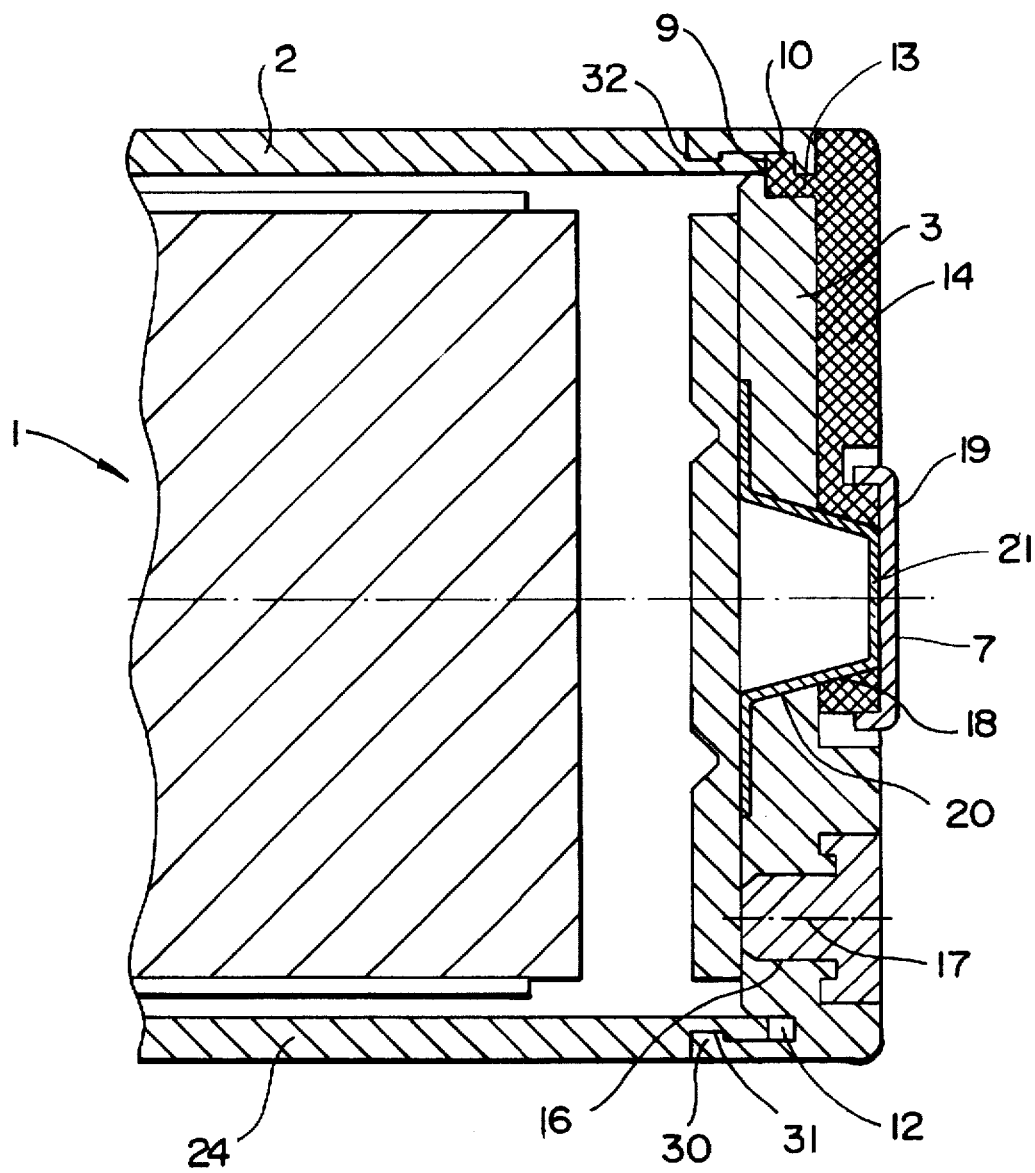
FIG. 1 is a partly cross-sectional view through an accumulator of a first embodiment according to the invention with a cup-shaped pole cap.

In the Figures, the same or similar components of different embodiments are each denoted by the same references.

Without limitation in respect of the large number of design configurations which are possible by virtue of the present invention, a rectangular gas-tight and liquid-tight alkaline accumulator is described hereinafter. In that respect, the term gas-tight and liquid-tight is used in relation to accumulators to denote accumulators which do not allow either gases or liquids to escape under normal operating conditions but which can intentionally form openings when predetermined conditions are attained, such as for example a predetermined increased pressure.

The accumulator 1 has a casing which comprises two portions 2 and 3 and which surrounds the positive electrode 5 and the negative electrode 6. The electrodes 5 and 6 are separated from each other by the separator 4. In the condition in which it is ready for operation the accumulator 1 is filled in known manner with an electrolyte which is not shown in the Figures.

In the region of the pole contacts 7, 8 the casing is in two layers, comprising a layer of a hard plastic material 24 and a layer of a soft plastic material 14. The soft plastic material 14 which is shown by crossed hatching in the Figures is welded over the entire surface area to the hard plastic material 24 which is shown by inclined-line hatching.

With the hot-in-hot injection welding process which is used the welded surface is formed upon injection of the soft plastic material 14 along its contact surface relative to the hard plastic material 24. By virtue of the addition of plasticisers or by the choice of its degree of cross-linking, the soft plastic material 14 is of an adjustable hardness which is in the range of known sealing materials. The hardness of the hard plastic material is so adjusted that it reaches the usual levels of casing strength.

The materials used are modified polyamides styrene-ethylene-butylene-styrene-copolymers and/or polypropylene. The portions of the casing 2, 3, which comprise plastic material, each have a peripherally extending overlapping region 9, 10 in which they are in contact with each other over a surface area. The portions 9, 10 are held together by an ultrasound welded seam 11 extending therearound.

In a further configuration according to the invention, formed above the overlapping region 9 and enclosed by the region 10 is a volume 12 which extends around the periphery of the arrangement and which is connected by way of a passage 13 to the volume of the soft plastic material 14 in the region of the pole contacts 7, 8. That volume 12 is also simultaneously filled in the operation of injection welding of the soft plastic material 14. The soft plastic material 14 within the volume 12 is thus formed integrally with the soft plastic material 14 in the region of the pole contacts 7, 8 and is also welded over its full area to the hard plastic material 24.

In an alternative configuration the mechanical connection between the two casing portions 2, 3 is provided by retaining elements 30, 31 arranged in the overlapping region 9, 10. In that case, in the latched condition, a peripherally extending retaining projection 31 on the one casing portion 3 engages behind a peripherally extending groove 2 in the respective other casing portion 2. Assembly of the two portions 2, 3 is made easier by virtue of the retaining projection 31 having an inclined run-on surface 32. Within the volume 12 the soft plastic material 14 is either connected over the full surface area by injection welding to both regions 9, 10 or it is only connected by injection welding to the region 10 and the retaining elements 30, 31 hold the region 9 in contact against the soft plastic material 14, with a sealing effect at the end.

Glass fibres or other known inert fibres are optionally embedded into the hard plastic material 24. In that case a proportion by volume of glass fibres of about 40% is preferred.

A desired-rupture location 15 in the form of a portion of reduced thickness is arranged within the casing portion 2, 3 which comprises hard plastic material 24. The desired-rupture location 15 is of a defined area and thickness, which are so adjusted that, as from a given increased pressure within the accumulator casing, an opening is formed, which results in the pressure being reduced.

In the case of accumulators which are filled with caustic potash solution as the electrolyte, a through opening 16 is preferably arranged in the vicinity of the positive pole contact 7 and is of a substantially T-shaped profile. That opening 16 is closed by a T-shaped plug 17 after the filling operation.

A first embodiment includes pole contacts 7, 8 with a frustoconical feed-through ducting means 18, over which engages a cup-shaped pole cap 21. The frustoconical feed-through ducting means 18 bears with its laterally enlarged edge portion against the hard plastic material 24 in surface contact therewith and is held in a self-centred condition in a through opening 20 which is also frustoconical. The cup-shaped pole cap 19 is connected to the feed-through ducting means 18 by spot welding and engages over the soft plastic material 14 in sealing contact thereagainst. One or more spot welds 21 can be produced both prior to injection of the soft plastic material 14 and also thereafter. In the latter case, in known manner, the heat energy introduced in the welding operation is so selected that plastic deformation of the soft plastic material 14 and the hard plastic material 24 which forms the through opening 20 is prevented.

In an alternative embodiment the pole contacts 7, 8 are of a substantially T-shaped cross-section whose radially enlarged region represents the pole caps 19 and forms an integral transition into the feed-through ducting means 18. The ducting means 18 has an internal space 22 which is cylindrically hollowed out and which forms a cup-like rivet and which permits the end 23 to be flanged over. The flanged-over end 23 engages behind a part of the hard plastic material 24 in the region of the pole contacts 7, 8. In that way the pole cap 19 is durably pressed in sealing contact into the soft plastic material 14.

In a further embodiment, inserted between the flanged-over end 23 and the hard plastic material 24 is an electrically conductive tongue 25 which consists of metal and which makes a respective connection to each of the electrodes 5 and 6. The tongue 25 is connected by a spot weld 26 to connecting lugs 27, 28 which laterally project from the electrodes. The electrodes 5, 6 are arranged in the casing 2, 3 of the accumulator 1 in superposed relationship in a layer-like arrangement, as shown in FIGS. 2 and 3. Alternatively the electrodes 5, 6 are folded one over the other in a meander-like configuration, with the interposition of the separator 4, as shown in FIG. 6.

In this embodiment which preferably includes a respective pole contact 7, 8 at each of oppositely disposed sides of the casing, the electrode carrier of the positive electrode 5 is directly connected to the feed-through ducting means 18 while the feed-through ducting means 18 of the negative pole contact 8 is connected directly to the negative electrode 6 or to a strip 29 which is in contact with the negative electrode 6.

Figure 5:
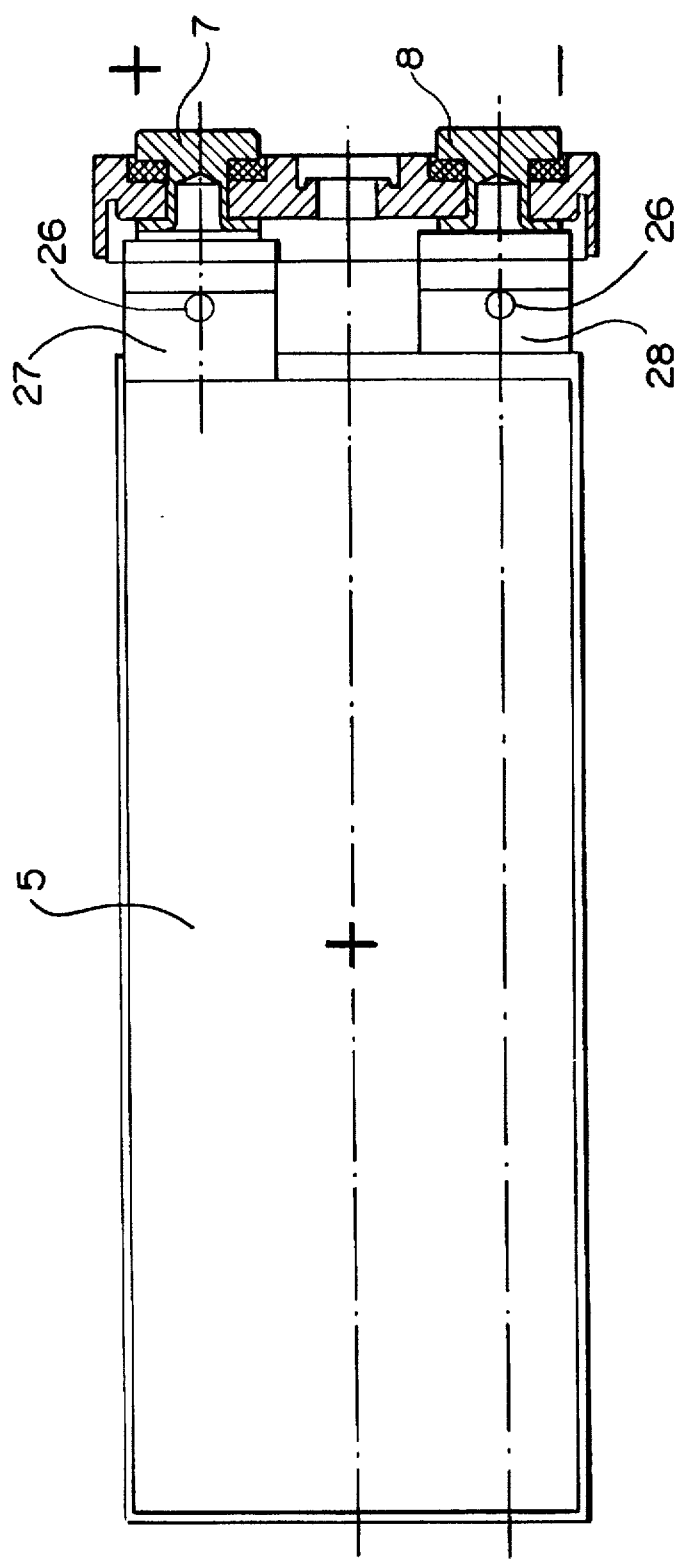
FIG. 5 shows an accumulator structural group mounted on a casing portion, during an intermediate step in production.

By virtue of the two-part casing structure, the electrodes 5, 6 can initially be fixed during manufacture to the pole contacts 7, 8 and a casing portion 3, by means of the connecting lugs 27, 28 of the electrodes 5, 6. Such an accumulator structural group is shown in FIG. 5, wherein the pole contacts 7, 8 are already sealingly held within the soft plastic material 14 and the hard plastic material 24.

Such a structural group can both be connected to the casing portion 2 shown in the Figures, and also fitted into a corresponding casing of an item of electrical equipment. The accumulator 1, with its casing, then forms a part of the casing of the item of electrical equipment.

What is claimed is:

1. An accumulator with a gas-tight and liquid-tight electrolyte-filled casing, in which are arranged electrodes that are separated from each other by a separator and are respectively electrically connected to pole contacts that are accessible from outside of said casing, wherein in a region of said pole contacts (7, 8) said casing (2, 3) comprises a soft plastic material (14) and a hard plastic material (24) that are fixedly connected together, and said soft plastic material (14) forms a seal for at least one of said pole contacts (7, 8) and a feed-through ducting means of said pole contacts.

2. The accumulator according to claim 1, wherein said soft plastic material (14) and said hard plastic material (24) have been connected together by injection welding over their full areas.

3. The accumulator according to claim 1, wherein said soft plastic material (14) and said hard plastic material (24) comprise a thermoplastic elastomer.

4. The accumulator according to claim 3, wherein said thermoplastic elastomer is selected from the group consisting of modified polyamide, styrene-ethylene-butylene-styrene copolymer and polypropylene.

5. The accumulator according to claim 1, wherein at least one of said pole contacts (7, 8) has a pole cap (19) that has been connected to said feed-through ducting means (18) by spot welding and engages cup-like over a part of said soft plastic material (14).

6. The accumulator according to claim 1, wherein said feed-through ducting means (18) forms a substantially cup-shaped rivet having a flanged-over end (23) that engages behind part of said hard plastic (24) so that at least one of said pole contacts (7, 8) and said feed-through ducting means (18) is held in sealing contact against said soft plastic material (14).

7. The accumulator according to claim 6, wherein said flanged-over end (23) engages behind a conductive tongue (25) inserted between said rivet and said casing.

8. The accumulator according to claim 1, wherein said casing (2, 3) includes a volume (12) that extends around said casing between two casing portions (2, 3) and is filled with said soft plastic material (14) as a seal.

9. The accumulator according to claim 8, wherein said soft plastic material (14) within said volume (12) and said soft plastic material (14) in said region of said pole contacts (7, 8) are joined together.

10. The accumulator according to claim 1, wherein said casing (2, 3) is comprised entirely of plastic material (14, 24) and said casing comprises two casing portions (2, 3) that have been joined together by ultrasonic welding in an overlapping region (9, 10).

11. The accumulator according to claim 1, wherein said casing (2, 3) is comprised entirely of plastic material (14, 24) and said casing comprises two casing portions (2, 3) that have been joined together by retaining elements (30, 31) arranged in an overlapping region (9, 10).

12. The accumulator according to claim 1, wherein said hard plastic material (24) has glass fibers embedded therein.

13. The accumulator according to claim 1, wherein a desired-rupture location (15) is arranged as a portion of reduced thickness within a part of said casing (2, 3) that consists of said hard plastic material (24).

14. The accumulator according to claim 1, wherein said casing (2, 3) has a filling opening (16) spaced closer to a positive pole contact (7) than a negative pole contact (8) and is closed with a plug (17) of T-shaped profile.

15. The accumulator according to claim 1, wherein said casing (2, 3) forms a part of a casing of an electrical device.

16. An accumulator with a gas-tight and liquid-tight electrolyte filled casing, in which are arranged electrodes that are separated from each other by a separator and are respectively electrically connected to pole contacts that are accessible from outside of said casing, wherein in a region of said pole contacts (7, 8) said casing (2, 3) comprises a soft plastic material (14) and a hard plastic material that are fixedly connected together, said soft plastic material (14) forms a seal for at least one of said pole contacts (7, 8) and a feed-through ducting of said pole contacts, said casing (2, 3) is prismatic, said electrodes (5, 6) are arranged in super-imposed relationship in a layer-wise manner respectively separated by said separator (4), and connecting lugs (27, 28) are arranged behind said pole contacts (7, 8), project laterally from said electrodes (5, 6) and are electrically connected to each other and to a respective pole contact.

17. The accumulator according to claim 16, wherein said casing (2, 3) is rectangular.

18. The accumulator according to claim 16, wherein said connecting lugs (27, 28) have been connected to each other and to respective pole contacts (7, 8) by spot welding.

* * * * *